United States Patent
Mo et al.

(10) Patent No.: US 11,403,590 B2
(45) Date of Patent: *Aug. 2, 2022

(54) SYSTEMS, APPARATUSES, AND METHODS OF EFFICIENT ROUTE PLANNING FOR E-COMMERCE FULFILLMENT

(71) Applicant: Coupang, Corp., Seoul (KR)

(72) Inventors: Wenting Mo, Beijing (CN); Yuanyuan Cen, Beijing (CN)

(73) Assignee: Coupang Corp., Seoul (KR)

( * ) Notice: Subject to any disclaimer, the term of this patent is extended or adjusted under 35 U.S.C. 154(b) by 372 days.

This patent is subject to a terminal disclaimer.

(21) Appl. No.: 16/732,160

(22) Filed: Dec. 31, 2019

(65) Prior Publication Data

US 2020/0279220 A1  Sep. 3, 2020

Related U.S. Application Data

(63) Continuation of application No. 16/290,040, filed on Mar. 1, 2019, now Pat. No. 10,565,543.

(51) Int. Cl.
  *G06Q 10/08*  (2012.01)
  *G06Q 10/04*  (2012.01)
  (Continued)

(52) U.S. Cl.
  CPC ..... *G06Q 10/08355* (2013.01); *G01C 21/343* (2013.01); *G06N 3/08* (2013.01); *G06N 20/00* (2019.01); *G06Q 10/047* (2013.01)

(58) Field of Classification Search
  CPC ........... G06Q 10/08355; G06Q 10/047; G06N 20/00; G06N 3/08; G01C 21/343
  See application file for complete search history.

(56) References Cited

U.S. PATENT DOCUMENTS

2009/0048890 A1  2/2009  Burgh
2010/0088146 A1*  4/2010  Zhong ................ G01C 21/3484
                                                                701/25
(Continued)

FOREIGN PATENT DOCUMENTS

CN       105224994 A  *  1/2016
CN       106779529 A      5/2017
(Continued)

OTHER PUBLICATIONS

Martin Reed, An ant colony algorithm for the multi compartment vehicle routing problem, Oct. 17, 2013, Science Direct (Year: 2013).*

(Continued)

*Primary Examiner* — Resha Desai
*Assistant Examiner* — Ismail A Manejwala
(74) *Attorney, Agent, or Firm* — Finnegan, Henderson, Farabow, Garrett & Dunner, LLP

(57) ABSTRACT

Methods, apparatuses, and systems of route planning for package pickup and delivery includes: receiving predetermined locations in a geographic region and data representing a predetermined route connecting the predetermined locations; determining unit areas in the geographic region based on sequential nearness of the predetermined locations along the predetermined route, the unit areas including a first unit area and a second unit area, and the unit areas being configured such that all locations in the first unit area are to be visited before visiting locations of the second unit area; generating delivery patterns for determining a route connecting at least one of the unit areas, each delivery pattern including at least one of the unit areas associated with a visiting sequence; when receiving task data including target locations to visit, determining a target route using the (Continued)

delivery patterns and the target data; and sending the target route to a mobile apparatus.

20 Claims, 10 Drawing Sheets

(51) Int. Cl.
  *G06N 20/00* (2019.01)
  *G01C 21/34* (2006.01)
  *G06N 3/08* (2006.01)

(56) References Cited

U.S. PATENT DOCUMENTS

| | | | |
|---|---|---|---|
| 2014/0129141 | A1 | 5/2014 | Nesbitt |
| 2017/0323249 | A1* | 11/2017 | Khasis ............... G01C 21/3492 |
| 2018/0158020 | A1 | 6/2018 | Khasis |
| 2018/0315319 | A1* | 11/2018 | Spector ............... G01C 21/343 |
| 2019/0114564 | A1* | 4/2019 | Ferguson ......... G06Q 10/06315 |

FOREIGN PATENT DOCUMENTS

| | | |
|---|---|---|
| CN | 109076312 A | 12/2018 |
| JP | 2004-238129 | 8/2004 |
| JP | 2005-158046 | 6/2005 |
| JP | 2010-78571 | 4/2010 |
| JP | 2018-026086 | 2/2018 |
| JP | 2018-73032 | 5/2018 |
| KR | 10-1999-0025643 | 4/1999 |
| KR | 10-2016-0070699 | 6/2016 |
| KR | 10-2018-0124526 | 11/2018 |
| TW | 200816076 | 4/2008 |
| WO | WO 2017/213621 A1 | 12/2017 |
| WO | WO 2020/178650 A1 | 9/2020 |

OTHER PUBLICATIONS

Ruhan He, Balanced K-Means Algorithm for Partitioning Areas in Large-Scale Vehicle Routing Problem, Nov. 22, 2009, IEEE (Year: 2009).*

Examination Report No. 1 dated Nov. 24, 2020, by the Australian Patent Office in Australian Application No. 2020231084, 5 pages.
Examination Notice dated May 27, 2021, by the Hong Kong Patent Office in Hong Kong Application No. 22020002619.7, 7 pages.
Notice of Reasons for Rejection dated Apr. 20, 2021, by the Japanese Patent Office in Japanese Application No. 2020-537734, 10 pages.
Examination Report No. 2 dated Jul. 5, 2021, by the Australian Patent Office in Australian Application No. 2020231084, 4 pages.
Notice of Allowance dated Jul. 27, 2021, by the Korean Patent Office in Korean Application No. 10-2019-0057666, 4 pages.
Notice of Allowance dated Aug. 17, 2021, by the Japanese Patent Office in Japanese Application No. 2020-537734, 4 pages.
Office Action dated Jul. 30, 2021, by the Taiwanese Patent Office in Taiwanese Application No. 110112024, 12 pages.
Search Report from the Korean Intellectual Property Office for Patent Application No. 109105423, 1 page.
International Search Report and Written Opinion dated May 29, 2020, by the International Searching Authority in PCT Application No. PCT/IB2020/051150, 8 pages.
T. Mikolov et al., "Efficient Estimation of Word Representations in Vector Space," Sep. 7, 2018 (12 pages).
H. Dai et al., "Learning Combinatorial Optimization Algorithms over Graphs," College of Computing, Georgia Institute of Technology, Ant Financial, Feb. 21, 2018 (24 pages).
Martin Reed, An ant colony algorithm for the multi compartment vehicle routing problem, Oct. 17, 2013, Science Direct, 2013 (22 pages).
Ruhan He, Balanced K-Means Algorithm for Partitioning Areas in Large-Scale Vehicle Routing Problem, Nov. 22, 2009, IEEE, 2009, (4 pages).
Notice of Preliminary Rejection dated Dec. 28, 2020, by the Korean Patent Office in Korean Application No. 10-2019-0057666, 12 pages.
Notification of Reason for Refusal issued by the Korean Patent Office in related Application No. KR 10-2021-0143572, dated Jan. 27, 2022.
Supplementary European Search Report in related International Application No. EP 20 76 7038, dated Feb. 9, 2022.
Office Action issued by the Taiwanese Patent Office in related Application No. TW 110112024, dated Feb. 17, 2022.

* cited by examiner

SYSTEMS, APPARATUSES, AND METHODS OF EFFICIENT ROUTE PLANNING FOR E-COMMERCE FULFILLMENT

CROSS-REFERENCE TO RELATED APPLICATIONS

This application is a continuation of and claims the benefit of priority to U.S. application Ser. No. 16/290,040, filed Mar. 1, 2019, the contents of which are hereby incorporated herein by reference.

TECHNICAL FIELD

The present disclosure generally relates to computerized systems and methods for efficient route planning for pickup and delivery. In particular, embodiments of the present disclosure relate to inventive and unconventional systems relate to efficient route planning for fast e-commerce order fulfillment.

BACKGROUND

Online shopping is popular nowadays. Electronic commerce (or "e-commerce") merchants strive to improve user experience by minimizing the period for order fulfillment, timed from an order being placed to a package of the order being delivered to the purchaser. One time-consuming portion of the fulfillment process is "last-mile delivery" (the delivery from a transportation hub to a final destination). For an urban area with high population density, the last-mile delivery may be especially challenging because of high delivery demands, high labor costs, stringent promised delivery time, complicated traffic regulations, and rapid-changing road conditions.

Conventional methods for delivery route planning in urban areas typically rely on experienced delivery workers, such as truck drivers. A driver may have to drive the same route for 3-5 years to discover an efficient route. Conventional back-end computer systems for route planning may have insufficient capability to internalize such experience in route planning. Also, such discovered routes are generally "inflexible"—that is, the conventional back-end systems may have difficulty adjusting them according to changing delivery conditions, which may lead to a load balance problem. For example, when some destinations of a discovered route have an unusually high demand on some day, the driver of that route may be overburdened, while drivers of other routes may be underutilized. However, conventional back-end systems may not optimize in adaptively rearranging the assignments of the drivers to handle this problem.

Another challenge in delivery route planning is restoration—that is, sorting packages in a carrier vehicle to optimize space utilization. Typically, the order of visiting the destinations would affect the restoration. For example, packages for delivery or picked up would be dropped off in a reverse order of storing them. That would be difficult to adjust their location and placement. The restoration problem is correlated with the delivery route planning problem, on which the conventional back-end systems have difficulty to handle with adaptiveness.

Some delivery route planning methods try to treat the problem as a Traveling Salesman Problem (TSP) and seek an approximate solution thereto. The goal of solving TSP is to minimize the time duration for a delivery worker (similar to the "traveling salesman") to visit all the destinations. However, conventional back-end systems are not optimized to factor some task characteristics or conditions in package delivery or pickup into the TSP solutions, such as that a right turn is easier than a left turn, parking difficulty levels of parking spots, driving accessibility of a neighborhood, driving time for U-turns, or the like.

Therefore, there is a need for efficient, dynamic route planning for e-commerce fulfillment.

SUMMARY

One aspect of the present disclosure is directed to a computer-implemented method of route planning for package pickup and delivery. The computer-implemented method includes: receiving, via at least one processor, predetermined locations in a geographic region and data representing a predetermined route connecting the predetermined locations; determining, using the at least one processor, unit areas in the geographic region based on sequential nearness of the predetermined locations along the predetermined route, wherein the unit areas comprise a first unit area and a second unit area, and the unit areas are configured such that all locations in the first unit area are to be visited before visiting locations of the second unit area; generating, using the at least one processor, delivery patterns for determining a route connecting at least one of the unit areas, wherein each delivery pattern comprises at least one of the unit areas associated with a visiting sequence; in response to receiving task data comprising target locations to visit, determining a target route for visiting the target locations using the delivery patterns and the target data; and sending the target route to a mobile apparatus.

Another aspect of the present disclosure is directed to apparatus of route planning for package pickup and delivery. The apparatus includes a memory and at least one processor. The memory stores instructions, and the at least one processor is configured to execute the instructions to: receive predetermined locations in a geographic region and data representing a predetermined route connecting the predetermined locations; determine unit areas in the geographic region based on sequential nearness of the predetermined locations along the predetermined route, wherein the unit areas comprise a first unit area and a second unit area, and the unit areas are configured such that all locations in the first unit area are to be visited before visiting locations of the second unit area; and generate delivery patterns for determining a route connecting at least one of the unit areas, wherein each delivery pattern comprises at least one of the unit areas associated with a visiting sequence; in response to receiving task data comprising target locations to visit, determine a target route for visiting the target locations using the delivery patterns and the target data; and send the target route to a mobile apparatus.

Yet another aspect of the present disclosure is directed to a system of route planning for package pickup and delivery. The system includes at least one mobile apparatus and a route planning computer system coupled to the at least one mobile apparatus using a network, The at least one mobile apparatus includes a memory storing instructions, and at least one processor configured to execute the instructions to: determine location data indicative of a location of the mobile apparatus; and send the location data to the route planning computer system. The route planning computer system includes a memory storing instructions, and at least one processor configured to execute the instructions to: receive, from the at least one mobile apparatus, the location data; select, from the location data, template locations in a geographic region and data representing a template route connecting the template locations; determine unit areas in the geographic region based on sequential nearness of the template locations along the template route, wherein the unit areas comprise a first unit area and a second unit area, and the unit areas are configured such that all locations in the first unit area are to be visited before visiting locations of the second unit area; generate delivery patterns for determining a route connecting at least one of the unit areas, wherein each delivery pattern comprises at least one of the unit areas associated with a visiting sequence; receive, from the at least one mobile apparatus, task data comprising target locations to visit; determine a target route for visiting the target locations using the delivery patterns and the target data; and send the target route to one of the at least one mobile apparatus.

Other systems, methods, and computer-readable media are also discussed herein.

DETAILED DESCRIPTION

Figure 1A:
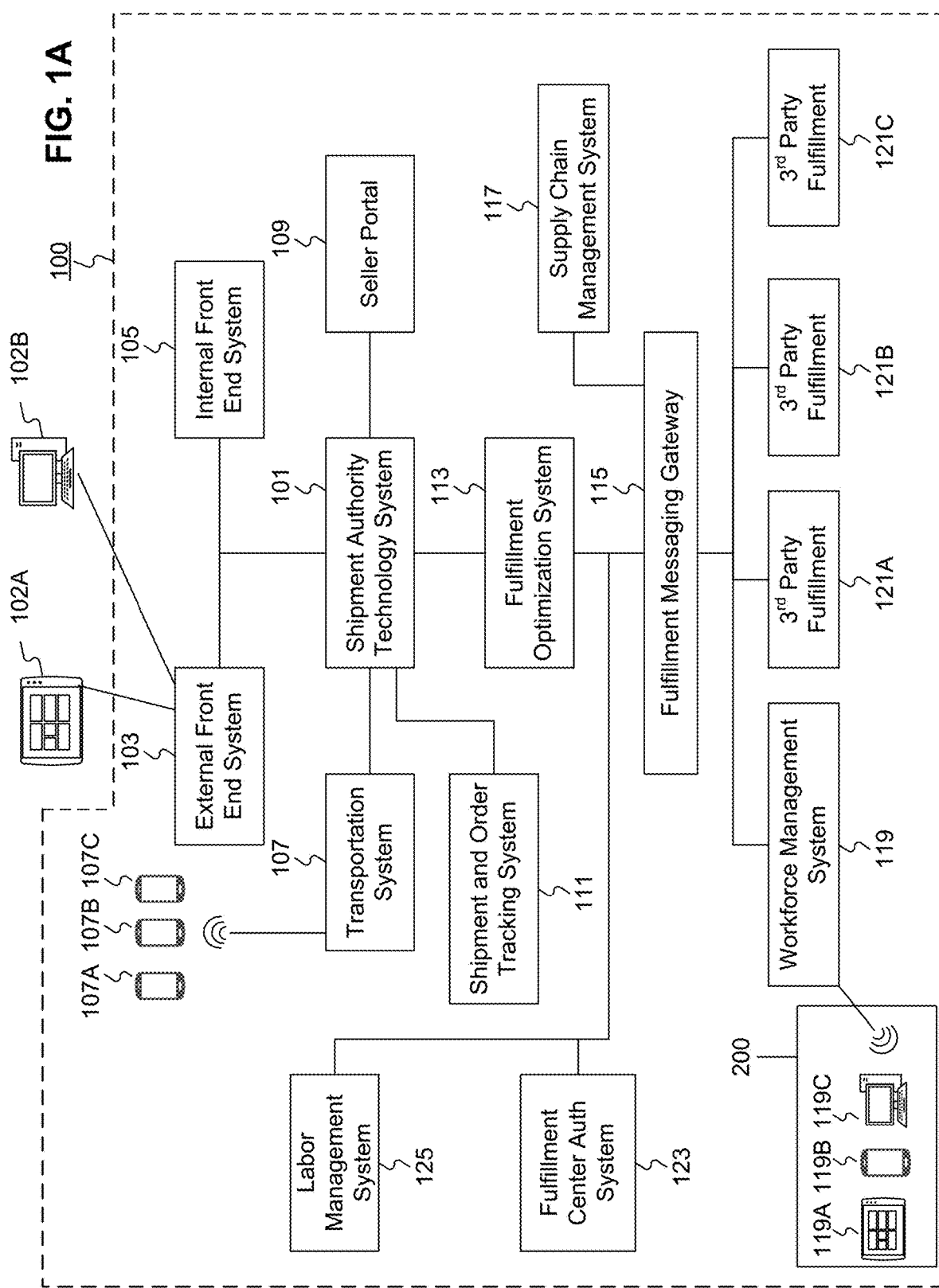
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other embodiments are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems, apparatuses, and methods configured for efficient route planning. According to embodiments disclosed herein, a system may use efficient routes discovered by experienced delivery workers in a geographic region as inputs of a machine learning technique to generate heuristic methods (or "heuristics" for simplicity) for determining combinations of a candidate route and a candidate worker associated with the candidate route. In some embodiments, the machine learning technique may divide a geographic region into multiple unit areas for delivery, which may be used as units for a graph embedding method to generate the heuristics.

According to embodiments disclosed herein, the system may receive delivery task data that includes a number of available delivery workers and a number of destination locations to the heuristics to generate the task combinations. In some embodiments, the available workers may be determined by their working status data collected by the system. In some embodiments, the heuristics may generate task combinations that reduce load imbalance, such as by adding or removing sub-routes to the candidate route, or by associating candidate routes of different complexity with candidate workers of different classifications in respective task combinations. In some embodiments, the heuristics may generate task combinations that also co-alleviate the restoration problem, such as by determining the order of destination locations along the candidate routes.

In some embodiments, the system may use a refinement or optimization technique to determine a target combination that includes a target worker and a target route. The target worker is selected from the candidate workers for the target combination. The target route is selected from the candidate routes for the target combination. For each task combination, a candidate task duration may be determined as a time duration estimated for the candidate worker to visit locations of the target route to complete a delivery and/or pickup task. As a result of the optimization technique, a task duration associated with the target task combination may be the shortest one among the candidate task durations of all candidate task combinations. In other words, the target task combination may be a heuristic solution to the Traveling Salesman Problem (TSP). The heuristic solutions can factor in the task characteristics by generating the heuristics using the efficiency routes discovered by the experienced delivery workers.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT)

system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
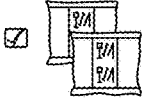
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
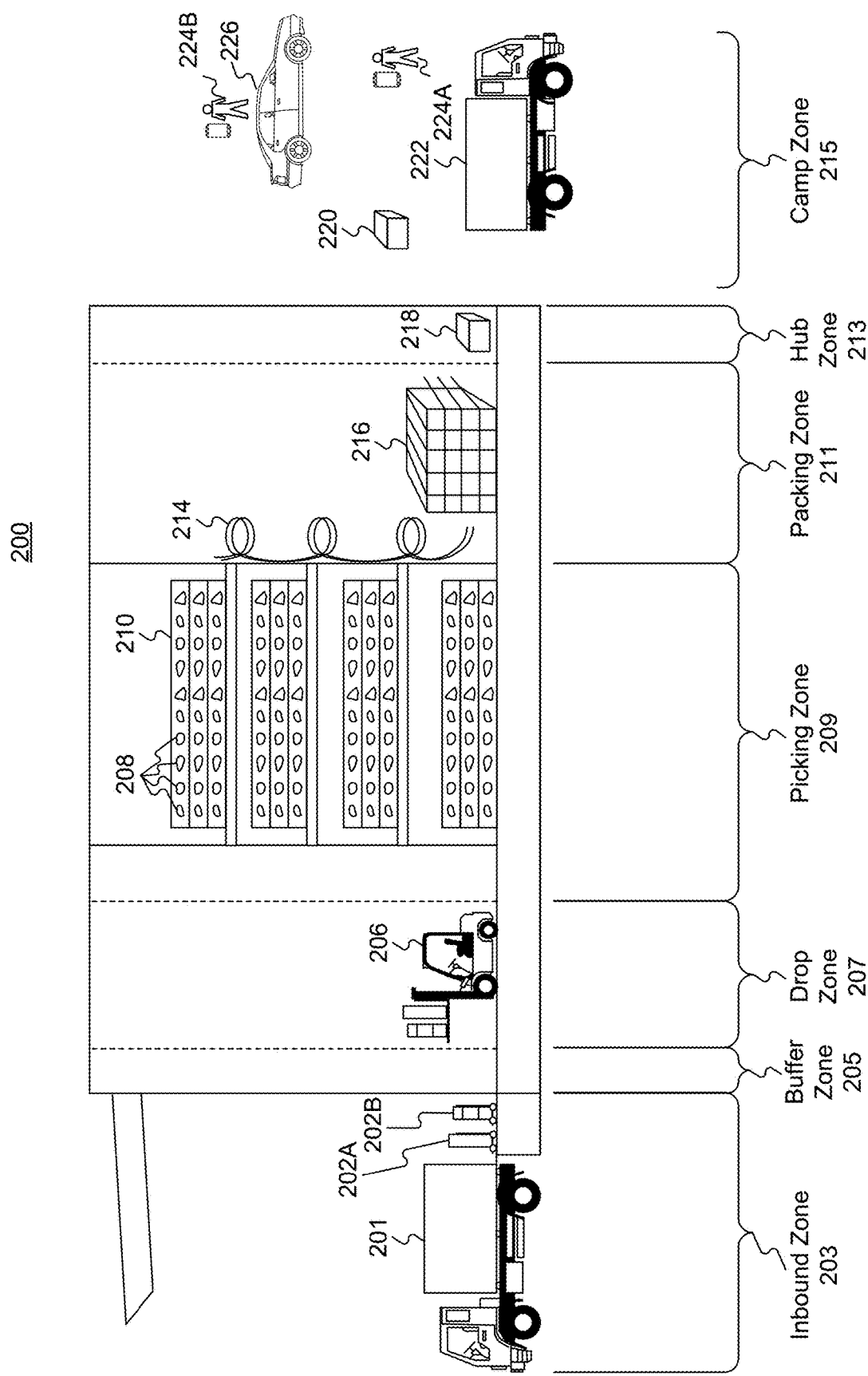
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

In some embodiments, the sorting of items of orders may be implemented in FC 200. For example, the sorting may be implemented in packing zone 211 using the sorting apparatus 216.

Figure 3:
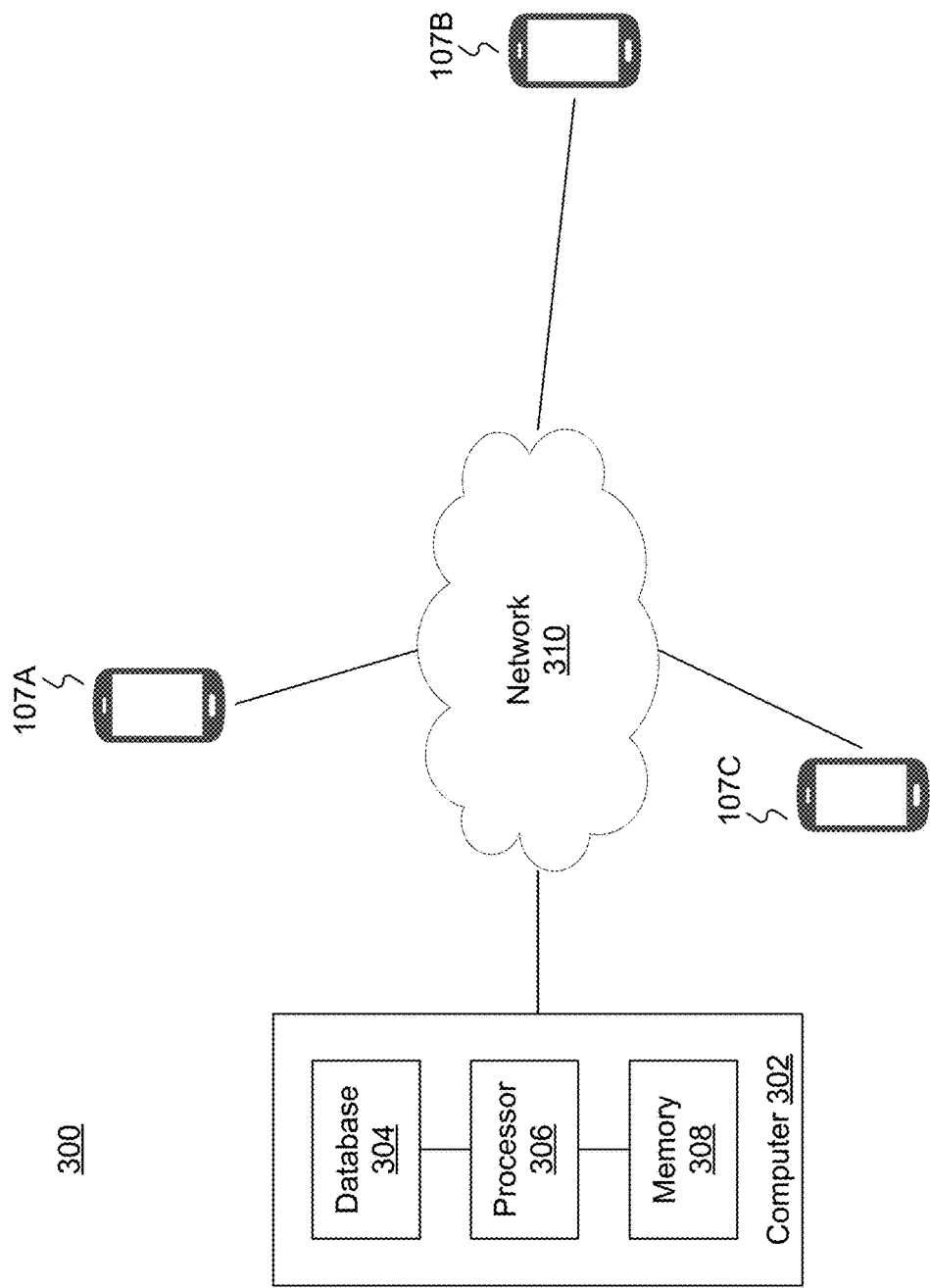
FIG. 3 is a diagrammatic illustration of an example system of route planning for package pickup and delivery, consistent with the disclosed embodiments.

FIG. 3 is a diagrammatic illustration of an example system 300 for route planning for package pickup and delivery, consistent with the disclosed embodiments. System 300 includes at least one mobile device (e.g., mobile devices 107A-107C) and at least one computer (e.g., computer 302). Although FIG. 3 only shows one computer 302 as an example, it should be understood that more than one computer similar to computer 302 may be included in system 300. Mobile devices 107A-107C are coupled to computer 302 using network 310. In some embodiments, computer 302 may be implemented as a computer in SAT 101, transportation system 107, SOT 111, FO 113, or WMS 119. In some embodiments, network 310 may be part or all of system 100.

Computer 302 may be implemented as any combination of any number of any type of computers, such as a microcomputer, a mainframe computer, a supercomputer, a general-purpose computer, a special-purpose computer, an integrated/embedded computer, a server computer, a personal computer, a laptop computer, a tablet computer, a cell phone, a personal data assistant (PDA), a wearable computing device, or a cloud computer. The computers in system 300, such as computer 302, may also be implemented as virtual computers that include multiple computers located at different geographic locations interconnected using a network (e.g., network 310).

Computer 302 includes database 304, processor 306, and memory 308. Memory 308 may store instructions that may be executed by processor 306 to implement processes or procedures for route planning. Database 304 may be implemented as any form of a collection of structured data stored in one or more local or remote computers or a distributed computer system and accessible to other computers.

Processor 306 may be a generic or specific electronic device capable of manipulating or processing information. For example, processor 306 may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type of circuit capable of data processing. The processor 306 may also be a virtual processor that includes one or more processors distributed across multiple machines or devices coupled via a network (e.g., network 310).

Memory 308 may be a generic or specific electronic device capable of storing codes and data accessible by processor 306 (e.g., via a bus, not shown). For example, memory 308 may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and one or more application programs (or "apps") for specific tasks. Memory 308 may also be a virtual memory that includes one or more memories distributed across multiple machines or devices coupled via a network (e.g., network 310).

Network 310 may be one or more public or private communication network. For example, network 310 may include any combination of any number of the Internet, an Intranet, a Local-Area Network (LAN), a Wide-Area Network (WAN), a Metropolitan-Area Network (MAN), a virtual private network (VPN), a wireless network (e.g., compliant with the IEEE 802.11a/b/g/n), a wired network, a leased line, a cellular data network, and a network using Bluetooth connections, infrared connections, or Near-Field Communication (NFC) connections.

In some embodiments, delivery workers may be categorized in classifications by different standards, such as employment status (e.g., permanent, temporary, or shift employees), seniority (e.g., senior or novice employees), work shifts (e.g., full-day or half-day employees), transportation methods (e.g., walking, biking, or driving employees). Different classifications of workers can be assigned to delivery tasks that have different demand features. In some embodiments, identifiers of the delivery workers may be stored as records in database 404, and classifications of the delivery workers may be stored as attributes of the records. It should be noted that a "delivery worker" herein may perform a task of delivering packages, picking up packages, or a combination thereof.

In some embodiments, associations between identifiers of the delivery workers and identifiers of the mobile devices may be stored as records in database 304. For example, the database 304 may store an association of an identifier of a worker and an identifier of a mobile device may be as an entry. In some embodiments, mobile devices 107A-107C may be associated with delivery workers and/or delivery vehicles. Such associations may be based on ownership, designation, or temporary possession. For example, a delivery worker may own and be associated with mobile device 107A (e.g., a smartphone). As another example, mobile device 107B (e.g., an off-the-shelf PDA) may be assigned to and associated with a delivery truck. For another example, a delivery worker may log in mobile device 107C (e.g., a wearable device) and be associated with the same.

In some embodiments, mobile devices 107A-107C may be used to monitor and update statuses of delivery workers or vehicles, and transmit data indicative status data thereof to computer 302 via network 310. The status data may be indicative of, for example, whether a delivery worker or a vehicle is idle or busy with a task, whether a delivery worker or a vehicle is available to be assigned for new delivery tasks, a location of a delivery worker or a vehicle, attendance and overtime information of a delivery worker, a path taken by a delivery worker, a travel distance of a delivery worker or a vehicle, or any other status information related to delivery task management.

Methods, apparatuses, and systems of route planning for package pickup and delivery implemented according to this disclosure will be described in detail in connection to FIGS. 4-7 as follows. In FIGS. 4-7, processes 400, 600, and 700 may be implemented as software or firmware, such as program codes or instructions, stored in a computer-readable storage medium. The program codes or instructions may be read and executed by a processor to implement the aforementioned processes. For example, the computer-readable storage medium may be memory 308, and the processor may be processor 306. In some embodiments, the aforementioned processes may be implemented as special-purpose hardware, such as a PLA, a PAL, a GAL, a CPLD, an FPGA, a SoC, or an ASIC. The aforementioned processes may be implemented as algorithms programmed into the special-purpose hardware that may perform the operations specified by the algorithms. In some embodiments, the aforementioned processes may be implemented as a combination of the above-mentioned software and hardware.

Figure 4:
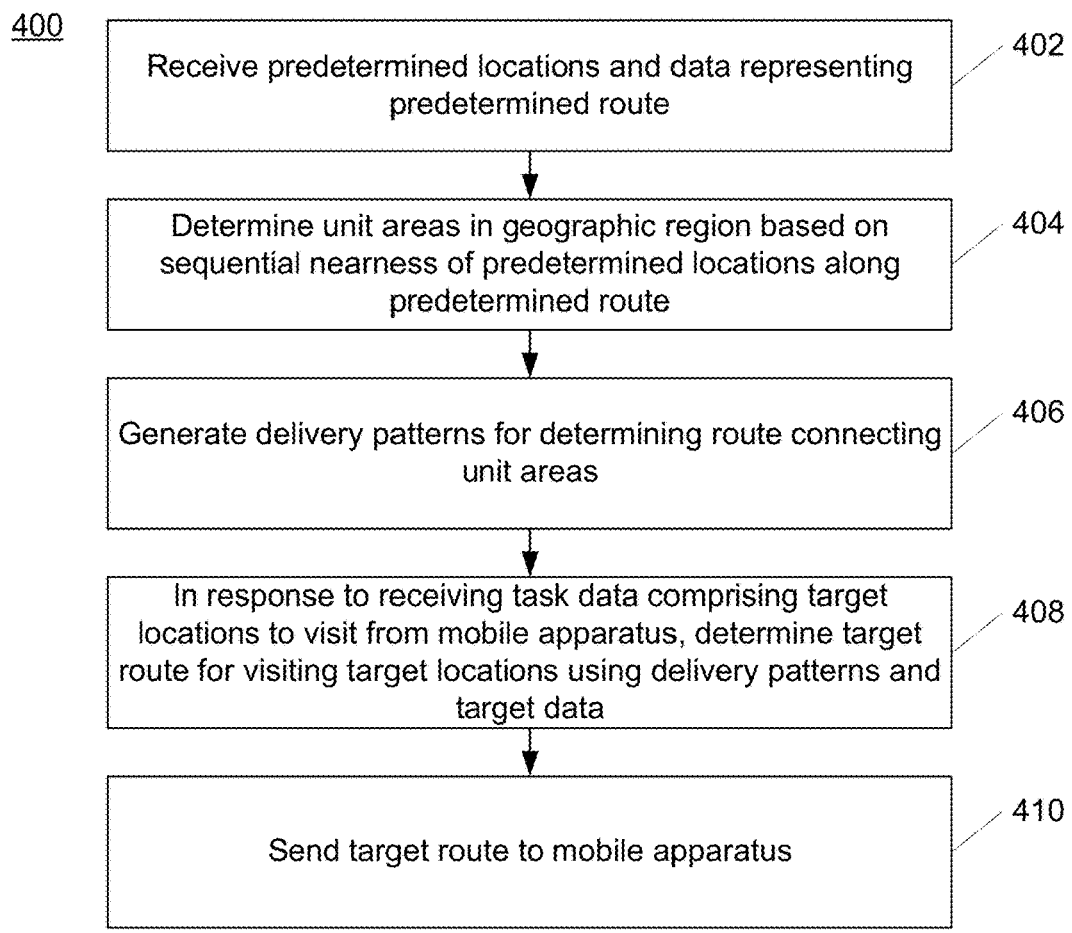
FIG. 4 is a flowchart of an example process of route planning for package pickup and delivery, consistent with the disclosed embodiments.

FIG. 4 is a flowchart of an example process 400 of route planning for package pickup and delivery, consistent with the disclosed embodiments.

At step 402, processor 306 receives predetermined geographic locations in a geographic region and data representing a predetermined route that connects the predetermined geographic locations. In some embodiments, the predetermined geographic locations and the predetermined route may be routes used by experienced delivery workers working in the geographic region. They may be predetermined manually, such as by evaluations of a supervisor, or automatically, such as by a machine. For example, processor 306 may determine a score for a delivery route of a delivery worker. The score may indicate delivery efficiency or level of experience for the delivery worker working on the delivery route. In some embodiments, the score may be calculated based on various factors, such as time spent on completing delivery along the route, a number of packages delivered or picked up for the route, time spent in traveling between different postal codes, or the like. In some embodiments, the score may be proportional to the delivery efficiency. In some embodiments, the score may be inversely proportional to the delivery efficiency. The predetermined locations and the predetermined route may be used as templates for route planning, and may be alternatively termed as "template locations" and "template route," respectively. To determine the template route for the template locations, in some embodiments, processor 306 may select the route connecting the template locations and having the highest score as the template route, assuming the score is proportional to the delivery efficiency. In some embodiments, processor 306 may select the route connecting the template locations and having the shortest traveling time as the template route.

In the above example, when the score is above a predetermined value, processor 306 may determine the delivery route as the predetermined route and geographic locations of the delivery route as the predetermined geographic locations. In some embodiments, processor 306 may sort the scores for all delivery workers in the geographic region and select a top percentage of them as experienced workers. Processor 306 may use geographic locations and routes visited by the selected experienced workers as input.

As another example, the routes used by experienced delivery workers may be categorized in accordance with identifiers of delivery workers and overall directions the routes or sequences of the visited locations. For the same set of locations, different delivery workers may for different routes while yielding approximately the same level of efficiency. Those different routes may include different considerations and/or limitations in route planning. By including and categorizing those different routes, characteristics and features of those considerations and limitations may be factored in the system for route planning.

At step 404, processor 306 determines unit areas in the geographic region based on sequential nearness of the predetermined locations along the predetermined route. A unit area is a geographic area that includes a set of geographic units that may be independent geographic granules for a delivery worker to visit. For example, the unit area may be a building, a mall, a neighborhood, an area surrounded by roads, a community, or any set of locations. The geographic units may be a house, an apartment, a store, an office, or a room in a building, or a building in a community.

Figure 5:
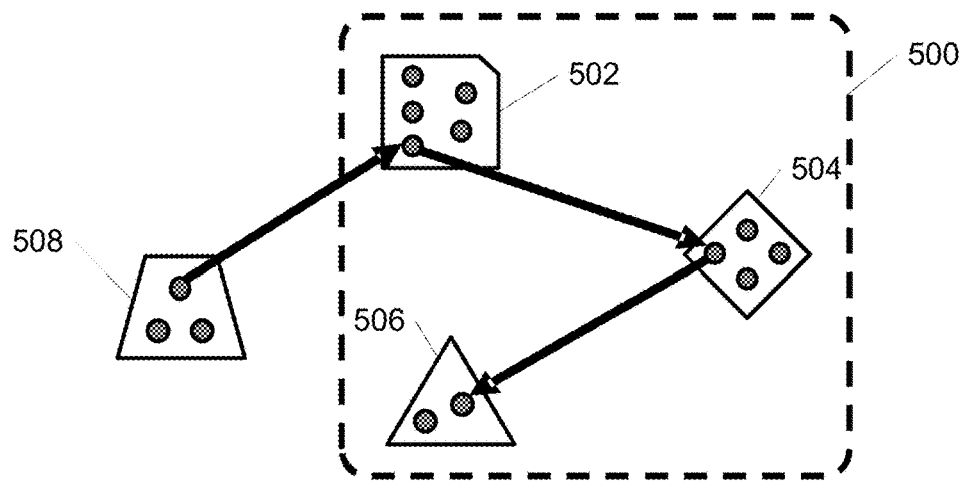
FIG. 5 is a diagram showing example unit areas and an example delivery pattern, consistent with the disclosed embodiments.

FIG. 5 is a diagram showing example unit areas, consistent with the disclosed embodiments. In FIG. 5, a dot represents a geographic unit, and polygons 502-508 represent unit areas. There are five geographic units in unit area 502, four geographic units in unit area 504, two geographic units in unit area 506, and three geographic units in unit area 508. The unit areas 502-508 are divided in such a fashion that a delivery worker may sequentially visit the geographic units in one of the unit areas 502-508 before visiting any other building in any other unit area. In some embodiments, different parts of a geographic unit may be determined to belong to different unit areas. For example, a multi-entrance unit area (e.g., a mall) may cover a large area, inside which geographic units (e.g., rooms or stores) may have different distances to each entrance. Those entrances may include a first entrance distant from a second entrance, such as the first entrance and the second entrance being at different streets. For a first geographic unit near the first entrance and a second geographic unit near the second entrance, the first geographic unit, and the second geographic unit may be divided into two different unit areas for efficient route planning.

In some embodiments, the unit areas may be used as units for route planning and generation. For example, to generate a route for a given set of locations, all locations within one unit area may be collectively treated as one stop in the route—that is, a delivery worker (e.g., a truck driver) may stop at those locations for package delivery or pickup, and set out for a next stop when completing the delivery task in the current unit area. Using unit areas as units for route planning and generation may reduce computation cost and complexity, and increase delivery efficiency. For example, in FIG. 5, unit areas 502-508 may be treated as stops of a planned route.

Referring back to FIG. 4, at step 406, processor 306 generates delivery patterns for determining a route connecting at least one of the unit areas. Each delivery pattern may include at least one of the unit areas, and the at least one of the unit areas may be associated with a visiting sequence. The visiting sequence may represent an order of visiting the at least one of the unit areas in a delivery pattern. In a delivery pattern, the visiting sequence may be fixed. For example, in FIG. 5, a delivery pattern 500 includes unit areas 502-506, and unit areas 502-506 are associated with a visiting sequence 502→504→506 indicated by the arrows in FIG. 5. Those delivery patterns may be used for route planning.

At step 408, if processor 306 receives task data that includes target locations to visit, processor 306 determines a target route for visiting the target locations using the delivery patterns and the target data. In some embodiment, the task data may be received from SAT 101.

At step 410, processor 306 sends the target route to a mobile apparatus. For example, the mobile apparatus may be any one of mobile devices 107A-107C. In some embodiments, the mobile apparatus may be carried by a delivery worker. The delivery worker may be assigned to a task to deliver or pick up packages along the target route received by the mobile apparatus.

In some embodiments, at step 404, processor 306 may determine the unit areas based on the sequential nearness of the predetermined locations along the predetermined route comprises. For example, processor 306 may receive deliverable locations in the geographic region. The deliverable locations may be locations available for delivery and pickup.

Processor 306 may determine a location vector for each of the deliverable locations using a first machine learning model. The location vectors may be a vector representation of a deliverable location, and be determined such that a distance between two location vectors may indicate sequential nearness of two locations corresponding to the two location vectors along a delivery route. The distance may be determined as a difference between the two location vectors. The sequential nearness may refer to how far two locations are visited along a delivery route. In some embodiments, the first machine learning model may be a first neural network model. For example, the first neural network model may be similar to a neural network of a word2vec model. In some embodiments, the first neural network model may use an address of a deliverable location in a one-hot vector format as inputs and determine a location vector for the deliverable location. The first neural network model may be generated and trained using the predetermined locations at step 402.

Processor 306 may then determine a feature vector for each of the deliverable locations. The feature vector may include the location vector and location attributes of the deliverable location. In some embodiments, the location features may include at least one of a geographic coordinate, a number of a building, a name of an area, a name of a road, or a postal code. For example, the feature vector may include the location vector and the following attributes: a building number, a name of a community, and a postal code, such as ([0.1,0.5,0.3], 3, "A", 10010) where [0.1,0.5,0.3] is the location vector, 3 is the building number, "A" is the name of a community, and 10010 is the postal code.

Processor 306 may then determine the unit areas by grouping the deliverable locations based on distances between the feature vectors. A distance between two feature vectors may be determined as a difference between the two feature vectors. Distances between feature vectors of deliverable locations grouped into one unit area may be within a predetermined threshold value. For example, for a first feature vector ([0.1,0.5,0.3], 3, "A", 10010) and a second feature vector ([0.12,0.48,0.3], 5, "A", 10010), the distance may be determined as a magnitude of a difference vector determined as direct subtraction between the two feature vectors, such as ([0.02,−0.02,0], 2, 0, 0). For characters, the subtraction may be performed using their ASCII values. If the magnitude of the difference vector is within the predetermined threshold value, the two corresponding deliverable locations may be grouped into the same unit area. In some embodiments, even if two deliverable locations share the same building number, the same name of a community, or the same postal code, they might be grouped into different unit areas as long as the magnitude of the difference vector exceeds the predetermined threshold value.

In some embodiments, the first neural network model for determining the location vector may be trained using the predetermined locations at step 402 as follows. Processor 306 may determine location vectors for each of the predetermined locations. For example, an element of a location vector may include an attribute of an address of a predetermined location. The attribute may include, for example, a street number, a street name, a room number, a city, a province or state, or a postal code.

Processor 306 may then determine probability values for a current location of the predetermined locations by inputting a location vector of the current location into the first neural network model. Each probability value may correspond to one of the predetermined locations and may indicate a probability that the one of the predetermined locations is to be visited immediately following the current location. Processor 306 may then determine probability values for each of the predetermined locations in an order of the predetermined route starting from the first predetermined location. The current location may be a predetermined location of which the probability value is currently being determined.

Processor 306 may then determine whether a subsequent location corresponds to the highest probability value. The subsequent location is the location immediately following the current location along the predetermined route. This step is to gauge whether the first neural network model is correctly trained. If it is correctly trained, the subsequent location would have the highest probability value. That is, the first neural network model would correctly predict the subsequent location as the next location to be visited after the current location.

If the subsequent location does not correspond to the highest probability value, processor 306 may update parameters of the first neural network model. In some embodiments, the first neural network model may include at least one hidden layer. The parameters may be the weights associated with each node of the hidden layer. The updating may be implemented using back propagation, for example.

If the subsequent location corresponds to the highest probability value, processor 306 may proceed to determine probability values for a location following the current location—that is, the subsequent location—by inputting a location vector of the subsequent location into the first neural network model. Such operations may be repeated until all predetermined locations along the predetermined route have been processed. Until then, the first neural network would be correctly trained such that, provided any of the predetermined location, the first neural network model would correctly predict the next location to visit along the predetermined route.

If a location following each of the predetermined locations along the predetermined route corresponds to the highest probability value in probability values determined by the first neural network model for the each of the predetermined locations, processor 306 may determine the first neural network model for determining the location vector for each of the deliverable locations at step 404. By using the first neural network model, processor 306 may determine the location vector with higher accuracy and more efficiency.

Figure 6:
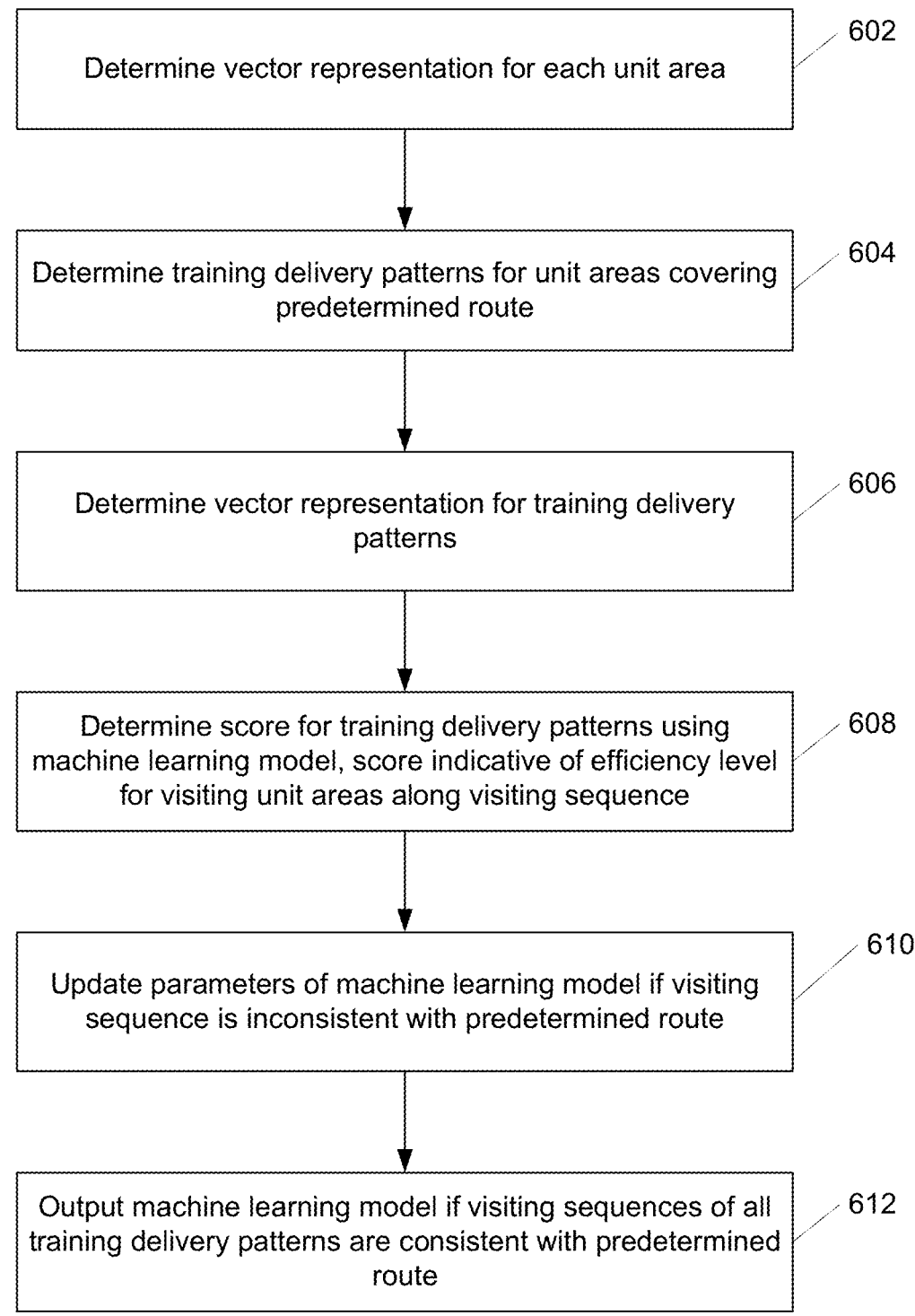
FIG. 6 is a flowchart of an example process of training a machine learning model for route generation, consistent with the disclosed embodiments.

FIG. 6 is a flowchart of an example process 600 of training a machine learning model for route generation, consistent with the disclosed embodiments. In process 600, the delivery patterns generated at step 406 of process 400 may be used for the route generation.

At step 602, processor 306 determines, for each of the unit areas, a vector representation of the unit area. In some embodiments, processor 306 may determine the vector representation by applying a graph embedding technique to addresses of locations in the unit area. The graph embedding technique may be used to map high-dimensional information (e.g., a graph) into low-dimensional information (e.g., a vector). In some embodiments, the address may be associated with a tag indicative of whether the address has been visited. The graph embedding technique may include such a tag into the embedding function for the address.

At step 604, processor 306 determines training delivery patterns for unit areas that cover the predetermined locations. Each training delivery pattern may include at least one of the unit areas ordered in a visiting sequence. The training delivery patterns may be determined for the purpose of training the machine learning model only. For example, the training delivery patterns may be determined from all unit areas identified as including at least one of the predetermined locations. In some embodiments, the training delivery patterns may be determined by grouping identified unit areas along the predetermined route. In some embodiments, each of the training delivery patterns may include at most three unit areas.

In some embodiments, the training delivery patterns may be determined and stored substantially simultaneously with the unit areas at step 404 in process 400. In those embodiments, processor 306 may retrieve the stored training delivery patterns at step 604.

In some embodiments, at step 404, processor 306 may use a first neural network model to determine the unit areas and the training delivery patterns substantially simultaneously. For example, processor 306 may record the current location and a previous location determined by a first neural network model to generate a pattern connection (e.g., a relationship, segment, or other correspondence between the locations).

In one example, processor 306 may then determine a frequency value reflecting how often a particular pattern connection occurs in one or more predetermined routes. If that pattern connection corresponds to a frequency value exceeding a predetermined value (e.g., 2, 3, 4, or any positive integer), processor 306 may accept the pattern connection and use it to generate the training delivery pattern.

In another example, processor 306 may then determine whether to accept the current connection based on the probability value determined for the current location by the first neural network model. In this example, if the current location corresponds to the highest probability value as the subsequent location of the previous location, processor 306 may accept the current connection and use it to generate the training delivery pattern.

At step 606, processor 306 determines a vector representation for each training delivery pattern. In some embodiments, the vector representation of the delivery pattern may be similar to the vector representation of a unit area. In some embodiments, the vector representation of a training delivery pattern may be determined by adding vector representations of the unit areas therein.

At step 608, processor 306 determines a score for each training delivery pattern. The score may indicate an efficiency level for visiting the unit areas along the visiting sequence. In some embodiments, processor 306 may determine the score by inputting the vector representation of the training delivery pattern into the machine learning model. In some embodiments, different training delivery patterns may include the same set of unit areas but have different visiting sequences. By calculating the scores for each thereof, the efficiency level of the different visiting sequences may be determined and used to determine the most efficient route for the same set of unit areas.

At step 610, if the visiting sequence is inconsistent with the predetermined route, processor 306 updates parameters of the machine learning model. In some embodiments, if the visiting sequence is not the same with any portion of the predetermined route, processor 306 may determine that the visiting sequence is inconsistent with the predetermined route. In some embodiments, the machine learning model may be a second neural network model. In some embodiments, the second neural network model may include at least one hidden layer. The parameters may be the weights associated with each node of the hidden layer. The updating may be implemented using back propagation, for example.

At step 612, if the visiting sequences of all of the training delivery patterns are consistent with the predetermined route, processor 306 determines the machine learning model for generating the delivery patterns. In some embodiments, if the visiting sequence of any training delivery patterns is consistent with a portion of the predetermined route, processor 306 may determine that the visiting sequences of all of the training delivery patterns are consistent with the predetermined route. Until this step, the machine learning model may be correctly trained. By using the machine learning model, processor 306 may generate the delivery patterns with higher accuracy and more efficiency.

In some embodiments, generating the delivery patterns at step 406 in FIG. 4 may be implemented using the machine learning model determined in process 600. For example, processor 306 may determine candidate delivery patterns using the unit areas. Each candidate delivery pattern may include at least one of the unit areas ordered in a visiting sequence. This step may be implemented similarly to step 604. In some embodiments, all feasible combinations of the unit areas may be generated and determined as the candidate delivery patterns.

Processor 306 may then determine a vector representation for each candidate delivery pattern. In some embodiments, the vector representation of a candidate delivery pattern may be determined by adding vector representations of the unit areas in the candidate delivery pattern. This step may be implemented similarly to step 606.

Processor 306 may then determine a score for each candidate delivery pattern by inputting the vector representation of the candidate delivery pattern into the trained machine learning model. This step may be implemented similarly to step 608.

Processor 306 may then generate the delivery patterns as the candidate delivery patterns that have scores higher than a predetermined threshold value. Processor 306 (or another device) may use the delivery patterns to generate routes, as discussed below with respect to FIG. 7.

Figure 7:
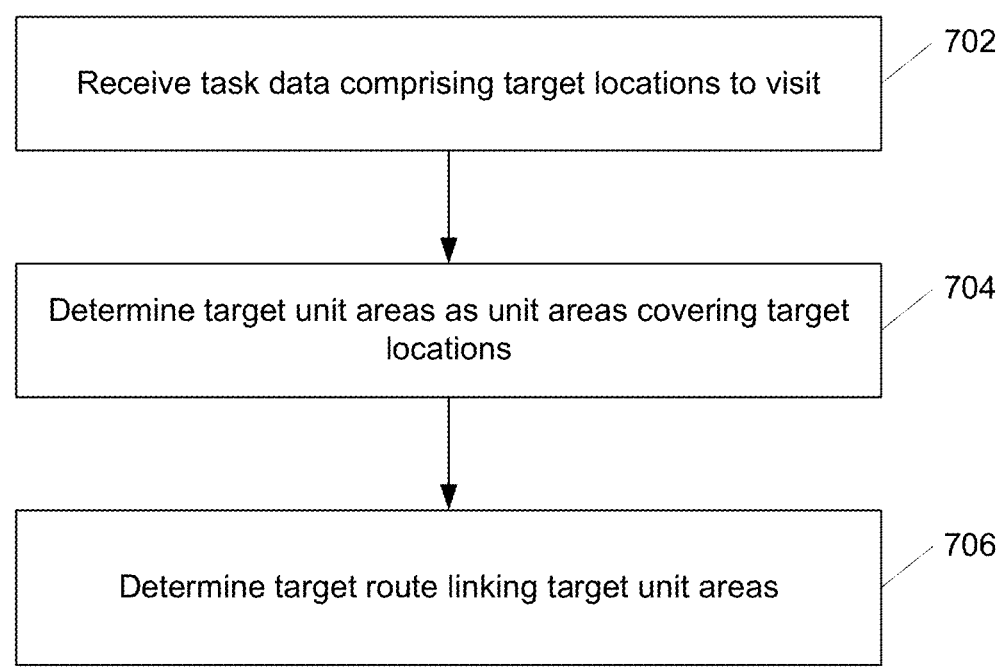
FIG. 7 is a flowchart of an example process of route generation for package pickup and delivery, consistent with the disclosed embodiments.

FIG. 7 is a flowchart of an example process 700 of route generation for package pickup and delivery, consistent with the disclosed embodiments.

At step 702, processor 306 receives task data that includes target locations to visit. For example, the target locations may be delivery or pick-up destinations, such as the addresses of customers. The target locations may be in the same geographic region as at step 402 of process 400. In some embodiments, the target data may further include distances between target locations.

At step 704, processor 306 determines target unit areas as unit areas covering the target locations. For example, the target unit areas may include all unit areas that include at least one of the target locations. In some embodiments, distances between the target unit areas may be determined from the distances between the target locations.

At step 706, processor 306 determines a target route linking the target unit areas. The delivery worker may visit each target unit area for once along the target route. In some embodiments, processor 306 may determine the target route as follows.

Processor 306 may determine at least one set of feasible delivery patterns linking the target unit areas. In some embodiments, the feasible delivery patterns include all delivery patterns generated at step 406 that may cover the target locations and have scores higher than the predetermined threshold value. By linking the visiting sequences of the feasible delivery patterns in an end-to-end manner, the target unit areas may be linked in a single candidate route. In some embodiments, there may be more than one combination of feasible delivery patterns that may link the target unit areas in a single candidate route. In other words, there may be multiple candidate routes to link the target unit areas. In that case, processor 306 may determine the target route as follows.

Processor 306 may then determine the target route as a feasible delivery pattern having the shortest time for the delivery worker to visit the target unit areas. In some embodiments, based on the distances between the unit areas determined at step 704, a time duration may be estimated for the delivery worker to travel along a candidate route to visit the target unit areas. The target route may be determined as the candidate route that having the shortest time duration.

While the present disclosure has been shown and described with reference to particular embodiments thereof, it will be understood that the present disclosure may be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects may also be stored on other types of computer-readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules may be created using any of the techniques known to one skilled in the art or may be designed in connection with existing software. For example, program sections or program modules may be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An apparatus of route planning for package pickup and delivery, comprising:
   a memory storing instructions; and
   at least one processor configured to execute the instructions to:
   receive data representing a predetermined route connecting predetermined locations;
   determine unit areas in the geographic region based on sequential nearness of the predetermined locations along the predetermined route;
   determine, for each of the unit areas, a vector representation of the unit area;
   determine training delivery patterns for unit areas covering the predetermined locations, wherein each training delivery pattern comprises at least one of the unit areas ordered in a visiting sequence;

determine a vector representation of at least one training delivery pattern by adding vector representations of the at least one of the unit areas in the at least one training delivery pattern;
determine a score for at least one training delivery pattern by inputting the vector representation of the at least one training delivery pattern into a first machine learning model;
update parameters of the first machine learning model based on a determination that the visiting sequence is inconsistent with the predetermined route;
determine the first machine learning model for generating the delivery patterns based on a determination that the visiting sequences of all of a plurality of the training delivery patterns are consistent with the predetermined route;
generate delivery patterns for determining a route connecting at least one of the unit areas, wherein each delivery pattern comprises at least one of the unit areas associated with a visiting sequence;
in response to receiving target locations, determine a target route for visiting the target locations using the delivery patterns and the target data; and
send the target route to a mobile apparatus.

2. The apparatus of claim 1, wherein the unit areas comprise a first unit area and a second unit area, and the unit areas are configured such that all locations in the first unit area are to be visited before visiting locations of the second unit area.

3. The apparatus of claim 1, wherein determining the vector representation for each of the unit areas comprises applying a graph embedding technique to address of locations in each of the unit areas.

4. The apparatus of claim 1, wherein the score indicates an efficiency level for visiting the at least one of the unit areas along the visiting sequence.

5. The apparatus of claim 1, wherein determining the unit areas in the geographic region further comprises:
receiving deliverable locations in the geographic region;
determining a location vector for each of the deliverable locations using a second machine learning model, wherein a distance between two location vectors indicates sequential nearness of two locations corresponding to the two location vectors along a delivery route;
determining, for each of the deliverable locations, a feature vector comprising the location vector and location attributes of the deliverable location; and
determining the unit areas by grouping the deliverable locations based on distances between the feature vectors, wherein distances between feature vectors of deliverable locations grouped into a unit area are within a predetermined threshold value.

6. The apparatus of claim 5, wherein the location attributes comprise at least one of a geographic coordinate, a number of a building, a name of an area, a name of a road, or a postal code.

7. The apparatus of claim 5, wherein the second machine learning model comprises a neural network model, and the at least one processor is further configured to execute the instructions to:
determine location vectors for each of the predetermined locations, wherein an element of a location vector comprises an attribute of an address of each of the predetermined locations;
determine probability values for a current location of the predetermined locations by inputting a location vector of the current location into the neural network model, wherein each probability value corresponds to one of the predetermined locations and indicates a probability of the one of the predetermined location being visited immediately following the current location;
determine whether a subsequent location immediately following the current location along the predetermined route corresponds to the highest probability value;
update parameters of the neural network model based on a determination that the subsequent location does not correspond to the highest probability value; and
determine probability values for the subsequent location by inputting a location vector of the subsequent location into the neural network model based on a determination that the subsequent location corresponds to the highest probability value.

8. The apparatus of claim 7, wherein the at least one processor is further configured to execute the instructions to:
determine the neural network model for determining the location vector for each of the deliverable locations based on a determination that a location following each of the predetermined locations along the predetermined route corresponds to the highest probability value in probability values determined by the neural network model for each of the predetermined locations.

9. The apparatus of claim 1, wherein the first machine learning model comprises a neural network model, and the at least one processor configured to generate the delivery patterns is further configured to execute the instructions to:
determine candidate delivery patterns using the unit areas, wherein each candidate delivery pattern comprises at least one of the unit areas ordered in a visiting sequence;
determine a vector representation of each candidate delivery pattern by adding vector representations of the at least one of the unit areas in the candidate delivery pattern;
determine a score for each candidate delivery pattern by inputting the vector representation of each candidate delivery pattern into first machine learning model; and
generate the delivery patterns as the candidate delivery patterns having scores higher than a predetermined threshold value.

10. The apparatus of claim 1, wherein the at least one processor is further configured to execute the instructions to:
receive task data comprising the target locations to visit;
determine target unit areas as unit areas covering the target locations; and
determine the target route linking the target unit areas, wherein each target unit area is to be visited for once along the target route.

11. The apparatus of claim 10, wherein the first machine learning model comprises a neural network model, and the at least one processor configured to determine the target route linking the target unit areas is further configured to execute the instructions to:
determine at least one set of feasible delivery patterns linking the target unit areas; and
determine the target route as a feasible delivery pattern having the shortest time for visiting all of the target unit areas.

12. A computer-implemented method of route planning for package pickup and delivery, comprising:
receiving data representing a predetermined route connecting the predetermined locations;
determining, by at least one processor, unit areas in the geographic region based on sequential nearness of the predetermined locations along the predetermined route;

determining, by the at least one processor, for each of the unit areas, a vector representation of the unit area;

determining, by the at least one processor, training delivery patterns for unit areas covering the predetermined locations, wherein each training delivery pattern comprises at least one of the unit areas ordered in a visiting sequence;

determining, by the at least one processor, a vector representation of at least one training delivery pattern by adding vector representations of the at least one of the unit areas in the at least one training delivery pattern;

determining, by the at least one processor, a score for at least one training delivery pattern by inputting the vector representation of the at least one training delivery pattern into a first machine learning model;

updating parameters of the first machine learning model based on a determination that the visiting sequence is inconsistent with the predetermined route;

determining, by the at least one processor, the first machine learning model for generating the delivery patterns based on a determination that the visiting sequences of a plurality of the training delivery patterns are consistent with the predetermined route;

generating, by the at least one processor, delivery patterns for determining a route connecting at least one of the unit areas, wherein each delivery pattern comprises at least one of the unit areas associated with a visiting sequence;

in response to receiving target locations, determining, by the at least one processor, a target route for visiting the target locations using the delivery patterns and the target data; and sending the target route to a mobile apparatus.

13. The computer-implemented method of claim 12, wherein the score indicates an efficiency level for visiting the at least one of the unit areas along the visiting sequence.

14. The computer-implemented method of claim 12, wherein determining the unit areas further comprises:
receiving deliverable locations in the geographic region;
determining a location vector for each of the deliverable locations using a second machine learning model, wherein a distance between two location vectors indicates sequential nearness of two locations corresponding to the two location vectors along a delivery route;
determining, for each of the deliverable locations, a feature vector comprising the location vector and location attributes of the deliverable location; and
determining the unit areas by grouping the deliverable locations based on distances between the feature vectors, wherein distances between feature vectors of deliverable locations grouped into a unit area are within a predetermined threshold value.

15. The computer-implemented method of claim 14, wherein the location attributes comprise at least one of a geographic coordinate, a number of a building, a name of an area, a name of a road, or a postal code.

16. The computer-implemented method of claim 14, wherein the second machine learning model comprises a neural network model, and the method further comprises:
determining location vectors for each of the predetermined locations, wherein an element of a location vector comprises an attribute of an address of each of the predetermined locations;
determining probability values for a current location of the predetermined locations by inputting a location vector of the current location into the neural network model, wherein each probability value corresponds to one of the predetermined locations and indicates a probability of the one of the predetermined location being visited immediately following the current location;
determining whether a subsequent location immediately following the current location along the predetermined route corresponds to a highest probability value;
updating parameters of the neural network model based on a determination that the subsequent location does not correspond to the highest probability value; and
determining probability values for the subsequent location by inputting a location vector of the subsequent location into the neural network model based on a determination that the subsequent location corresponds to the highest probability value.

17. The computer-implemented method of claim 16, further comprising:
determining the neural network model for determining the location vector for each of the deliverable locations based on a determination that a location following each of the predetermined locations along the predetermined route corresponds to the highest probability value in probability values determined by the neural network model for each of the predetermined locations.

18. The computer-implemented method of claim 12, wherein each training delivery pattern comprises at most three unit areas.

19. The computer-implemented method of claim 12, wherein the first machine learning model comprises a neural network model, and generating the delivery patterns comprises:
determining candidate delivery patterns using the unit areas, wherein each candidate delivery pattern comprises at least one of the unit areas ordered in a visiting sequence;
determining a vector representation of each candidate delivery pattern by adding vector representations of the at least one of the unit areas in the candidate delivery pattern;
determining a score for each candidate delivery pattern by inputting the vector representation of each candidate delivery pattern into the first machine learning model; and
generating the delivery patterns as the candidate delivery patterns having scores higher than a predetermined threshold value.

20. The computer-implemented method of claim 14, further comprising:
receiving task data comprising the target locations to visit;
determining target unit areas as unit areas covering the target locations; and
determining the target route linking the target unit areas, wherein each target unit area is to be visited for once along the target route.

* * * * *

UNITED STATES PATENT AND TRADEMARK OFFICE
CERTIFICATE OF CORRECTION

PATENT NO. : 11,403,590 B2
APPLICATION NO. : 16/732160
DATED : August 2, 2022
INVENTOR(S) : Wenting Mo et al.

It is certified that error appears in the above-identified patent and that said Letters Patent is hereby corrected as shown below:

In the Claims

Claim 3, Column 23, Lines 32-33, "to address of locations" should read --to addresses of locations--.

Signed and Sealed this
Eleventh Day of October, 2022

*Katherine Kelly Vidal*
Katherine Kelly Vidal
*Director of the United States Patent and Trademark Office*